United States Patent

Moore

Patent Number: 5,266,097
Date of Patent: Nov. 30, 1993

[54] AMINOUREAFORMALDEHYDE FERTILIZER METHOD AND COMPOSITION

[75] Inventor: William P. Moore, Hopewell, Va.

[73] Assignee: The Vigoro Corporation, Chicago, Ill.

[21] Appl. No.: 999,102

[22] Filed: Dec. 31, 1992

[51] Int. Cl.$^5$ .............................................. C05C 9/02
[52] U.S. Cl. ............................................ 71/28; 71/29;
71/30; 71/64.11; 71/904; 564/63; 564/73;
528/259; 47/9; 504/116
[58] Field of Search ..................................... 71/27–30,
71/64.07, 64.11, 64.13, 904; 564/63, 73;
528/259

[56] References Cited

U.S. PATENT DOCUMENTS

| | | | |
|---|---|---|---|
| 3,677,736 | 7/1972 | Formaini | 71/28 |
| 4,089,899 | 5/1978 | Greidinger et al. | 260/553 |
| 4,378,238 | 3/1983 | Goertz | 71/29 |
| 4,554,005 | 11/1985 | Hawkins | 71/30 |
| 4,781,749 | 11/1988 | Moore | 71/28 |
| 5,039,328 | 8/1991 | Saitoh et al. | 71/28 |

FOREIGN PATENT DOCUMENTS

260511 9/1988 Fed. Rep. of Germany .......... 71/28

*Primary Examiner*—Ferris Lander

[57] ABSTRACT

A new method of preparing a new aminoureaformaldehyde fertilizer composition which exhibits high cold water insoluble nitrogen (CWIN) levels and high Availability Indices (AI). The method utilizes the discoveries that ammonia compounds, usually ammonium salts, inhibit the urea-formaldehyde polymerization reaction and decrease the formation of hot water insoluble nitrogen (HWIN), and that the ammonium compounds take part in the reaction to form controlled release compounds which are both cold water soluble and insoluble. The process is carried out at elevated temperatures between 60 and 125° F., so that it may be completed in an order of magnitude less time than either the dilute or concentrated conventional commercial ureaform processes, requiring between 2 and 20 minutes for completion. In the process, between 3 and 25 percent of the total nitrogen is supplied as ammonia nitrogen with the remainder from urea, respective formaldehyde to urea to ammonia mol ratio is 1.0, between 1.0 and 2.0 and between 0.05 and 1.0. The new fertilizer composition is produced directly as semi-dry granules, the drying of which may be completed in a conventional dryer such as a fluid bed, and exhibits urea conversions to CWIN between 50 and 85 percent with AIs higher than 45. The method is most effectively performed batchwise in a high intensity mixer-reactor-granulator comprising a cylindrical pan rotating around a near-vertical axis and containing a small diameter mixer rotating at a high speed relative to that of the pan.

19 Claims, No Drawings

AMINOUREAFORMALDEHYDE FERTILIZER METHOD AND COMPOSITION

BACKGROUND OF THE INVENTION

1. Field of the Invention

This invention relates to controlled release nitrogen fertilizers and methods for their preparation. More particularly, the invention relates to a ureaformaldehyde fertilizer composition and a method for producing these compositions exhibiting increased conversions of urea nitrogen to cold water insoluble nitrogen (CWIN) with low conversions to hot water insoluble nitrogen (HWIN). The new method relates to the discovery that ammonia nitrogen in relatively small amounts in the ureaformaldehyde reaction inhibits the polymerization to HWIN compounds and allows the reaction to CWIN to occur in short reaction times at elevated temperatures. A new and effective aminoureaformaldehyde fertilizer composition, combining high CWIN conversions, high nitrogen availability indices (AIs), and low unreacted free urea concentrations, is provided by the new method.

2. Description of Related Art

Ureaformaldehyde condensation products are widely used as slow release nitrogen fertilizers in crops and ornamental plants. The condensation products normally contain methylene urea polymers which have limited water solubilities and release nitrogen throughout an extended period. The methylene urea polymers are understood to be degraded by microbial action into water soluble mineral nitrogen slowly. The ureaformaldehyde fertilizers are usually evaluated by the amount and the release characteristics of their water insoluble nitrogen.

The longer chain water insoluble ureaformaldehyde polymers are more slowly available than the shorter chain polymers, and it is generally known in the art that the efficiency of nitrogen release decreases as the methylene urea chain lengths increase. When methylene urea chain lengths are long enough that their nitrogen contents are insoluble in hot water, it is known that the nitrogen does not become available for plant utilization in soil for a very long period of time, if ever.

Many of the granular ureaformaldehyde fertilizers now found in commercial use have 60 percent or more of their CWIN insoluble in hot water, and practically unavailable as a plant nutrient.

The prior art has decreased the ratio of HWIN to CWIN in ureaformaldehyde fertilizers by admixing additional water soluble urea during the preparation, but this process leaves large amounts of free and unreacted urea and increases the phytotoxicity of the mixture.

Slow release ureaformaldehyde fertilizers are usually prepared by reacting urea and formaldehyde at elevated temperatures in an alkaline solution to produce methylol ureas. This reaction mixture is then acidified to polymerize the methylol ureas to methylene ureas which increase in chain length as the reaction is allowed to continue.

Greidinger et al disclose in U.S. Pat. No. 4,089,899 the reaction of urea and formaldehyde in the presence of an acid catalyst for long reaction times at low temperatures to prepare slow release ureaform compounds with lower average degrees of polymerization than conventional fertilizers. The Greidinger products contain large amounts of free urea which are undesirable from the standpoints of rapid nitrogen release and plant phytotoxicity.

Formaini disclosed in U.S. Pat. No. 3,677,736 a multistage method of producing liquid fertilizer suspensions of ureaformaldehyde with a high Activity Index (AI), by reacting urea and formaldehyde in the presence of ammonia first under alkaline conditions and then under acid conditions. Conversions of urea nitrogen to CWIN were low, leaving large amounts of unreacted urea.

Goertz disclosed in U.S. Pat. No. 4,378,238 a particulate controlled release solid fertilizer, the reaction product of urea and formaldehyde, which contained polymeric nitrogen in the form of methylene urea polymers of varying chain lengths with at least 60 percent of the polymeric nitrogen in the form of cold water soluble nitrogen polymers (CWSNP) and, preferably, less than 20 percent CWIN. The Goertz product contains short chain polymers selected from the group consisting of methylene diurea and dimethylene triurea. Goertz teaches the use of a degree of polymerization greater than 1.5, where the degree of polymerization is the ratio of urea to methylene groups in the methylene urea polymers. The conversion of urea nitrogen to CWIN was generally low, which indicates that most of the nitrogen is quickly released when applied to the soil in substantial amounts thereby creating conditions phytotoxic to plants.

Edwin F. Hawkins claimed a clear liquid ureaformaldehyde based fertilizer, in U.S. Pat. No. 4,554,005, containing 30 percent triazone, less than 2 percent methylene diurea, and less than 3 percent monomethylol urea. The liquid was made by reaction of urea and formaldehyde at mol ratios between 1.2 and 1.6/1 with ammonia amounting to between 3 and 3.5 percent by weight of the reaction mixture at a pH between 8.8 and 9.2, maintained by continued addition of caustic solution and then continuing to heat after terminating the caustic addition. Although Hawkins used ammonia to produce a storage stable clear liquid fertilizer, the product contained no CWIN and did not provide a slow release, nitrogen source. Although Hawkins did provide a method of producing a liquid with reduced phytotoxicity, he did not find or suggest a method for producing a granular product whose nitrogen was composed substantially of safe and efficiently used CWIN and HWSN.

The prior art provides processes for ureaformaldehyde fertilizers exhibiting high activity indices (AI) with low conversions of urea nitrogen to WIN, and also processes for fertilizers exhibiting high conversions to WIN, with low AIs. No methods have been provided, or proposed, for the preparation of ureaformaldehyde fertilizers exhibiting high conversions of urea N to WIN and high AIs.

No granular ureaformaldehyde fertilizer compositions have been taught in the prior art which exhibit the properties of high AI and high urea conversions to CWIN, although the agronomic desirability of such a product has been known for a long time.

Semi-spherical granules have been produced commercially and reported in the art by a variety of techniques using water soluble nitrogen products, such as urea, potassium nitrate, and ammonium phosphate, and the practical advantages of handling, blending, and storing the semi-spherical granules are known and well documented. The prior art has not provided methods for the direct production of water insoluble ureaformaldehyde fertilizers in the form of attrition resistant semi-spherical granules.

Terms used herein are defined as follows:
CWSN = cold water soluble nitrogen;
CWSNP = cold water soluble nitrogen polymers;
CWIN = cold water insoluble nitrogen;
HWIN = hot water insoluble nitrogen;
HWSN = hot water soluble nitrogen;

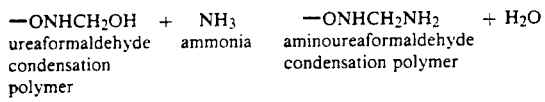

$$AI = \frac{(CWIN - HWIN) \times 100}{CWIN} = \text{Activity (Availability) Index};$$

Highly Available CWIN = AI of 50-85;
Semi-Spherical = free flowing, generally ball shaped;
Fertilizer Enhancing Ingredients = materials which improve nutritive or physical properties of solid fertilizers;
Percent = weight percent; unless otherwise specified.

An aminoureaformaldehyde polymer is a condensation product of ammonia, urea, and formaldehyde. Its formation may be represented by the following equation:

—ONHCH₂OH + NH₃ → —ONHCH₂NH₂ + H₂O
ureaformaldehyde   ammonia   aminoureaformaldehyde
condensation               condensation polymer
polymer Aminomethylene dimethylene triurea, a typical condensation polymer of 1 mol formaldehyde, 1 mol urea, and 0.33 mols of ammonia may be represented in many isomeric forms but may be simply illustrated by the following linear structural formula:

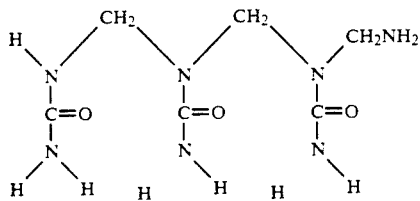

OBJECTS OF THE INVENTION

A primary object of this invention is to overcome the problems cited in the prior art by providing a new method by which urea, formaldehyde, and ammonia may be reacted to produce controlled release solid aminoureaformaldehyde nitrogen fertilizers directly.

A further object of this invention is to provide a new solid aminoureaformaldehyde nitrogen fertilizer composition, which exhibits both high urea N conversion to CWIN and high AI, and which performs with improved effectiveness as a slow release plant nutrient.

A further object of this invention is to provide the conditions whereby the new method may be effectively performed to produce the new composition.

A further object of this invention is to provide a new method by which urea, formaldehyde, ammonia, and other plant nutrients may be combined to produce semi-spherical granules of plant nutrients, in a matrix of slow release aminoureaformaldehyde nitrogen fertilizer.

A further object of this invention is to provide a new plant nutrient composition comprising plant nutrients combined in a matrix of aminoureaformaldehyde slow release fertilizer.

SUMMARY OF THE INVENTION

The present invention is directed to a method of producing slow release nitrogen fertilizers and to the fertilizer compositions made thereby, comprising aminoureaformaldehyde polymers, exhibiting properties of high urea nitrogen conversions to CWIN and high availability of the CWIN. The invention is based on the surprising discovery that ammonia reacts with urea and formaldehyde to form cold water insoluble nitrogen polymers and that ammonia strongly inhibits the formation of hot water insoluble nitrogen polymers; and on the discovery of the reaction conditions required to effectively utilize the method. The new method allows a heretofore unknown and agronomically slow release nitrogen fertilizer.

The instant method of producing highly available aminoureaformaldehyde slow release nitrogen fertilizer solids requires accurately mixing the aqueous reactants, formaldehyde, urea, and ammonia, in respective mol ratios of, 1.0, between 1.0 and 2.0, and between 0.05 and 1.00, before acidifying the mixture to a pH between 2.8 and 4.0, and heating to a temperature between 60 and 125° C., with continued mixing, to initiate acid catalyzed polymerization of ammonia, urea, and formaldehyde. The acid catalyzed polymerization must be continued for a period of time between 2 and 20 minutes until the ammonia is reacted with the urea and formaldehyde to produce CWIN in the form of aminoureaformaldehyde polymer containing between 3 and 25 percent of its nitrogen derived from ammonia. When between 50 and 85 percent of the urea nitrogen has been converted to CWIN, it is necessary to neutralize the acid catalyst.

The present invention provides an improved slow release aminoureaformaldehyde-based fertilizer composition containing highly available plant nutrient nitrogen, the composition comprising between 15 and 40 percent total nitrogen of which between 3 and 25 percent is derived from ammonia and the remainder substantially derived from urea, with between 50 and 85 percent of the urea converted to CWIN which exhibits an AI higher than 45.

The new method allows the production of solid composite fertilizers containing up to 50 percent of other fertilizer enhancing ingredients homogeneously contained in a matrix of aminoureaformaldehyde solid polymer. The solid fertilizers may be prepared as semispherical granules by careful control of the polymerization conditions.

DETAILED DESCRIPTION OF THE INVENTION

The method of this invention produces CWIN aminoureaformaldehyde condensation polymers for use as slow release nitrogen fertilizers.

The aminoureaformaldehyde condensation products of the acid catalyzed reaction of formaldehyde, urea, and ammonia comprise many individual compounds and polymers. Some of these entities can be resolved into separate fractions by liquid chromatography, but it has not been possible to individually identify the water insoluble polymers by chromatography or other means. The polymers contain ammonia nitrogen which is no longer basic or water soluble, but which may be regenerated by boiling the polymer in aqueous base. The polymer is believed to be generally linear with some crosslinked and cyclic structures included.

The method of the present invention successfully produces highly available aminoureaformaldehyde slow release nitrogen fertilizer solids only when each aspect of the method is adhered to. Some variations in the individual aspects are possible and necessary to achieve optimum performance throughout the operating range of the method.

The method is successfully operable over a range of raw materials and product analyses when the aqueous reactants formaldehyde, urea, and ammonia are commingled in a respective mol ratio of 1.0 to between 1.0 and 2.0 to between 0.05 and 1.00. Successful operation requires that the commingled aqueous reactants be acidified to a pH between 2.8 and 4.0 and heated to a temperature between 60 and 125° C. while the commingling is continued to initiate the acid catalyzed polymerization of the formaldehyde, urea, and ammonia. When formaldehyde to urea mol ratios are higher than 1, it is not possible to obtain highly available nitrogen fertilizers and when urea to formaldehyde mol ratios are higher than 2.0 to 1.0, excess free urea undesirably remains in the product, creating the conditions for plant phytotoxicity. With ammonia to formaldehyde mol ratios lower than 0.05, small amounts of aminoureaformaldehyde polymers are formed and the ureaformaldehyde high polymer formation is not retarded sufficiently so that low AIs are obtained when high conversions of urea are achieved and when ammonia to formaldehyde ratios are higher than 1.0 urea polymerization is excessively inhibited so that large amounts of free urea remain unreacted.

The present method is not effective unless the acidification of the commingled aqueous reactants reduces pH initially to at least 4.0, because conversion to aminoureaformaldehyde and CWIN is very low and method operability from a mechanical standpoint is poor. When pH is reduced below 2.8, conversions to highly polymerized methylene ureas are rapid and an undesirably large portion of the CWIN is converted to HWIN resulting in product exhibiting low AI.

Commingling must be continued throughout the method and the aqueous reactants must be heated to a temperature between 60 and 120° C. to initiate the acid catalyzed polymerization of the formaldehyde, urea, and ammonia to aminoureaformaldehyde. Temperatures below 60° C. cause low conversions of urea to CWIN and poor mechanical operability of the method while temperatures above 120° C. cause product AIs to be low no matter how quickly the method is completed.

To achieve the desired slow release properties of the aminoureaformaldehyde nitrogen fertilizer solids and retain high availability of the nitrogen, the acid catalyzed polymerization is continued for a period of time between 2 and 20 minutes until the ammonia is reacted with the urea and formaldehyde to produce water insoluble nitrogen in the form of aminoureaformaldehyde polymer containing between 3 and 25 percent of its nitrogen which is derived from ammonia. Nitrogen fertilizers containing large amounts of unreacted urea are produced when the acid catalyzed polymerization is continued for less than 2 minutes. Although the ammonia strongly inhibits the formation of high molecular weight HWIN polymers even after 20 minutes polymerization, the AIs are reduced somewhat, and very low polymerization temperatures are required as reaction times are increased longer than 20 minutes.

When less than 3 percent of the nitrogen contained in aminoureaformaldehyde polymer is derived from ammonia, inhibition of high polymer HWIN formation is ineffective and HWIN methylene urea polymers are formed about like those in the well known urea-formaldehyde polymerizations. Ammonia nitrogen concentrations higher than 25 percent undesirably slow down the acid catalyzed reaction so that the amount of urea conversion to CWIN is undesirably low, and substantial amounts of unreacted ammonia remain in the nitrogen fertilizer product.

The acid catalyzed polymerization is terminated when between 50 and 85 percent of the urea nitrogen is converted to CWIN, by neutralizing the acid catalyst. When less than 50 percent of the urea is converted to CWIN, the resulting fertilizer does not have the desired properties of slow release and the product can cause phytotoxic reactions in treated plants. When urea conversions to CWIN are driven above 85 percent, it is not possible in the present process to retain the required high nitrogen availabilities.

Although the present invention can be practiced with a wide variety of aqueous sources of formaldehyde and urea, aqueous ureaformaldehyde concentrates containing between 45 and 60 percent formaldehyde and between 20 and 30 percent urea were found to be economical and effective sources of formaldehyde and urea.

The use of ammonia is critical to the effectiveness of the new method. Its effectiveness does not depend upon its basicity, but upon its ability to react with ureaformaldehyde compounds and polymers. It was found that ammonia in an ionic compound which forms ammonium ions in water was generally effective, and that the ammonia compounds anhydrous ammonia, ammonium hydroxide, ammonium chloride, ammonium nitrate, hexamethylene diamine, ammonium sulfate and ammonium phosphate were effective in the method. Ammonium sulfate and ammonium phosphate were particularly effective and provided economically practical sources of additional fertilizer nitrogen.

Control of the reaction ratios of formaldehyde to urea and ammonia is essential to the effectiveness of the present method and preferable results are obtained when 1 mol of formaldehyde is reacted with between 1.35 and 1.85 mols of urea and between 0.14 and 0.75 mols of ammonia.

Preferable operating conditions also include acid catalyzed polymerization at a pH between 3.0 and 3.3 and a temperature between 80 and 104° C. for a period of time between 5 and 12 minutes until the ammonia is reacted with the urea and formaldehyde to form CWIN polymers containing between 10 and 20 percent of their nitrogen derived from ammonia, and between 60 and 75 percent of the urea nitrogen has been converted to CWIN before the acid polymerization catalyst is neutralized.

The product made by the present invention is unique. It is a slow release aminoureaformaldehyde highly available nitrogen fertilizer composition comprising between 15 and 40 percent total nitrogen of which between 3 and 25 percent is derived from ammonia and the remainder substantially derived from urea with between 50 and 85 percent of the urea converted to cold water insoluble nitrogen. The high availability of the composition is indicated by its AI which is more than 45. The composition can contain less than 15 percent total nitrogen, but is of limited commercial value at those low concentrations. A maximum nitrogen concentration of about 42 is necessary to achieve the mol ratios required for the effective operation of the present method. Also, to achieve effective operation of the present method, it is necessary that between 3 and 25 percent of the nitrogen of the new composition be derived from ammonia with the remainder substantially derived from urea. The new composition contains slow release aminoureaformaldehyde made by conversion of between 50 and 85 percent of the urea to CWIN and the high availability of this nitrogen is indicated by its AI of more than 45.

It was discovered that the method of this invention is effective in producing composite fertilizers containing fertilizer enhancing solids. To produce these fertilizers, aqueous reactants formaldehyde, urea, and ammonia in respective mol ratios of 1.0 to between 1.0 and 2.0, and to between 0.05 and 0.75 are comingled with one or more comminuted fertilizer-enhancing solids, amounting to between 10 and 50 percent of the fertilizer. It is necessary to hold the formaldehyde, urea, ammonia mol ratios within the same range as when the aminoureaformaldehyde fertilizers are produced without added solids or the slow release nitrogen conversions and availabilities are undesirably low. To obtain the desired physical stability required for handling, shipping, and application without clumping and caking of the solid product, and to retain an effective level of available nitrogen, it is necessary to limit the amount of solids commingled with the reactants to between 0 and 50 percent of the final fertilizer product. Although it is possible to include more than 50 percent of the final product as fertilizer enhancing product, the strength of the aminoureaformaldehyde polymer in the composite product is reduced below commercially desired levels. Strength of the composite is also seriously decreased and homogeneity is not possible to achieve when the fertilizer enhancing solids commingled in the method are not comminuted.

The reactants formaldehyde, urea, and ammonia and the comminuted solids are preferably acidified to a pH between 2.8 and 3.2 and heated to a temperature between 60 and 125° C. to initiate acid catalyzed polymerization to aminoureaformaldehyde polymers. A slightly lower upper pH limit for effectiveness is necessary to achieve the desired polymerization when non-reacting fertilizer enhancing solids are added, although the same temperature of between 60 and 125° C. used in the straight aminoureaformaldehyde fertilizers may be effectively employed.

Although the composite fertilizer product formed may contain up to 50 percent fertilizer enhancing solids, the acid catalyzed polymerization only needs to be continued for a period of time between 2 and 20 minutes until the ammonia is reacted with the urea and formaldehyde to form a matrix of water insoluble aminoureaformaldehyde polymer containing between 3 and 25 percent of its nitrogen derived from ammonia which homogeneously contains the one or more comminuted fertilizer enhancing solids. The required ammonia nitrogen amounts are the same as those where the reactants alone are converted to highly available slow release nitrogen fertilizers.

It is necessary to terminate the polymerization in the method for composite fertilizers, as in the straight nitrogen method, when between 50 and 85 percent of the urea nitrogen is converted to CWIN, by neutralizing the acid catalyst.

To put the composite slow release fertilizer in its best commercial form, it is usually desirable to dry the neutralized polymerized matrix and homogeneously contained comminuted solids. When significant amounts of unreactive fertilizer enhancing solids are used in the method, the heat generated in the chemical reactions is usually not sufficient to dry the final product.

It was found that the fertilizer enhancing solids could comprise recycled slow release composite fertilizers recycled from previous preparations by the method for producing physically stable composite fertilizer. This aspect of the method provides an effective method for utilizing the portion of particles smaller in size than desired for solid fertilizer usage. Also other controlled release nitrogen fertilizer materials may be used as sources of fertilizer enhancing solids. Isobutylenediurea (IBDU) was found to form a particularly effective matrix product by use of the instant method.

An especially useful group of comminuted solids were found to be the solid fertilizer enhancing solids containing one, or more, of the plant nutrients: potassium, phosphorous, magnesium, calcium, iron, ureaformaldehyde polymers, and aminoureaformaldehyde polymers.

Effective non-nutritive fertilizer enhancing solids were found to include clay, fertilizer conditioners, organic soil conditioners, mulches, cytokinins and plant growth stimulants.

In the present invention, the comminuted solids may be acidified by any feasible manner. In some cases, heating formaldehyde or ureaformaldehyde concentrates with sufficient heat and for sufficient time will generate enough formic acid by the oxidation of formaldehyde to bring about the required acidification, but acid addition to the reaction mixture is the manner of acidification normally used. One, or more, of the commercially available acidic materials which are effective in acidifying the reactants and comminuted solids are listed as follows: phosphoric acid, formic acid, sulfuric acid, oxalic acid, citric acid, nitric acid, and ammonium sulfate.

Preferred operation of the instant method occurs when the matrix of water soluble nitrogen polymer is formed which contains between 10 and 20 percent of its nitrogen content derived from ammonia. Conditions of preferred operation also include neutralizing the acid catalyst to a pH between 6.7 and 7.5 with a base material. Effective base materials include magnesia, lime, caustic soda, caustic potash, ammonia, soda ash, and potash.

The operation of the present invention allows the preparation of a new composite fertilizer composition. This new and agronomically effective composition comprises a highly available aminoureaformaldehyde CWIN matrix which homogeneously contains one, or more, fertilizer enhancing materials. The composition contains between 15 and 42 percent total nitrogen of which between 2 and 20 percent is derived from ammonia, and contains between 10 and 50 percent of comminuted fertilizer enhancing solids. Compositions outside the above defined guidelines do not provide the agronomical and handling advantages of the defined composition because of lower physical integrities, lower urea conversions to CWIN, and lower AIs.

The most desirable and commercially useful form of the new composite fertilizer composition is that of granular particles. The instant method may be effectively used to prepare granular aminoureaformaldehyde slow release fertilizers which are highly available by commingling aqueous reactants formaldehyde, urea, and ammonia in respective mol ratios of 1.0 to between 1.0 and 2.0, and to between 0.05 and 0.75, and one or more comminuted fertilizer enhancing solids amounting to between 0 and 50 percent of the final fertilizer granules, as in the preparation of composite solid fertilizers.

The commingled reactants and comminuted solids are then acidified to a pH between 2.8 and 3.2 and heated to a temperature between 60 and 125° C. to initiate the acid catalyzed polymerization of the formaldehyde, urea, and ammonia to aminoureaformaldehyde polymers. To prepare the polymers in the form of granules, the acid catalyzed polymerization is performed in a rotating inclined pan which carries the polymers toward a stationary wall scraper-deflector which deflects the polymer toward a high speed rotor which provides a strong shear force and homogenization to the polymer and fertilizer enhancing solids. The initially viscous liquid polymer and contained solids are repeatedly passed through the rotor and the polymer and solids are rolled along the walls of the rotating inclined pan as the acid catalyzed polymerization continues until the ammonia is reacted with the urea and formaldehyde and a fluid matrix of water insoluble aminoureaformaldehyde polymer is formed into semi-spherical granules containing between 3 and 25 percent of their nitrogen derived from ammonia and which contain no more than 50 percent comminuted fertilizer enhancing solids.

To obtain the slow release composite fertilizer with high urea conversion to CWIN with high AIs, it is necessary to terminate the acid catalyzed polymerization when the semi-spherical granules solidify and between 50 and 85 percent of the urea has been converted to CWIN. The neutralization is best done by admixing a base to bring the neutralized product to a pH between 6.5 and 7.5.

MODE OF OPERATION OF THE INVENTION

Having described the basic concepts of the instant invention, reference is now made to the following examples which are provided to illustrate the invention's aminoureaformaldehyde fertilizer method of preparation and its efficacious composition.

EXAMPLE 1

This example demonstrates a preferred method of preparing highly available aminoureaformaldehyde slow release nitrogen fertilizer solids.

The device in which the method was performed consisted of a vertical rotary wheel pan 0.72 meters in diameter, 0.38 meters deep, inclined from the vertical position by 30°. The pan was equipped with a stationary wall scraper-deflector which deflects the contents of the pan toward a high speed rotor 0.35 meters in diameter located 6 centimeters from the bottom of the pan so that its tips pass 3 centimeters from the wall of the pan. The rotor consited of a 7.5 centimeter diameter shaft with 7 steel bars 2 centimeters thick and 5 centimeters wide protruding radially equi-spaced therefrom starting at the bottom of the shaft with each additional bar located 3 centimeters above the next lower bar.

The aqueous reactants, formaldehyde, ureau, and ammonia (as ammonium sulfate) were added to, and mixed in the pan in respective mol ratios of 1.0 to 1.39 to 0.68, in the amounts listed as follows:

| Reactants | Amount, Kg |
|---|---|
| U-F Concentrate. 60 HCHO, 25 Urea | 9.45 |
| Urea, 46-0-0 | 13.45 |

| Reactants | Amount, Kg |
|---|---|
| Ammonium Sulfate, 21-0-0-25(S) | 8.63 |

The reactants were acidified to a pH of 3.1 by the addition of 0.72 Kg of dilute black phosphoric acid (0-20-0) and heated to a maximum temperature of 80° C. while the inclined steel pan rotated clockwise at a rim speed of 0.55 meters per second and the rotor operated counterclockwise at a tip speed of 9.8 meters per second producing strong shear forces and initiating acid catalyzed polymerization.

The acid catalyzed polymerization was continued with the pH rising slightly for 15 minutes until the ammonia was reacted with the urea and formaldehyde and a viscous fluid matrix of water insoluble aminoureaformaldehyde polymer was formed into semi-spherical granules. These granules contained 20 percent of their total nitrogen derived from ammonia and the remaining 80 percent derived from urea.

The polymerization was terminated by adding 0.85 Kg of finely ground magnesia, assaying 57 percent magnesium to provide a final product pH of 6.5.

The semi-spherical granular product was dried in a fluid bed air dryer to a moisture content of 2.0 percent, showed good resistance to abrasion and required an average of 2.1 Kg weight to crush a 6–8 U.S. mesh granule.

EXAMPLE 2

This example demonstrates the new highly available slow release aminoureaformaldehyde nitrogen fertilizer composition. The product from Example 1 was analyzed to determine the nutrient concentrations listed as follows:

| Nutrient | Wt % |
|---|---|
| Total N | 31.0 |
| CWIN | 16.8 |
| HWIN | 6.7 |
| $P_2O_5$ | 0.3 |
| Mg | 0.2 |
| S | 7.0 |
| $NH_3$, free | 0.0 |

The analyses show that all of the ammonia was reacted and that 54.2 percent of the total nitrogen was converted to CWIN, with an AI of 60.1. The amount of CWIN is far above the 15 percent water insoluble nitrogen required to claim slow releasing nitrogen as cited on page 199 in the Western Fertilizer Handbook, fifth edition, published by the California Fertilizer Association.

The chemical analyses showed that all of the ammonia and urea nitrogen was accounted for in the solid aminoureaformaldehyde granular solid fertilizer recovered.

EXAMPLE 3

This example demonstrates a preferred embodiment of the instant invention whereby physically stable composite fertilizers are prepared which contain highly available slow release nitrogen and fertilizer enhancing solids which consist of recycled fines. The device used in this example was the same as that described in Example 1.

The aqueous reactants formaldehyde, urea, and ammonia, as ammonium sulfate, were added to, and commingled in respective mol ratios of 1.0, to 1.39, to 0.68, with recycled fines, dried and screened from product previously prepared, in the amounts listed as follows:

| Ingredients Commingled in Pan | Wt, Kg |
|---|---|
| U-F Concentrate, 60 HCHO, 25 Urea | 7.64 |
| Urea, 46-0-0 | 10.86 |
| Ammonium Sulfate, 21-0-0-25(S) | 6.95 |
| Recycled Fines, 30.1-0-0-7.1(S)-5H$_2$O | 6.36 |

The commingled reactants and comminuted recycled fines were acidified to a pH of 3.1 by admixing 0.7 Kg of diluted black phosphoric acid (0-20-0) and heated to a maximum temperature of 77° C. to initiate the acid catalyzed polymerization of the ammonia, urea, and formaldehyde. The acid catalyzed polymerization was continued for 12 minutes to form a matrix of water insoluble aminoureaformaldehyde polymer which contained 20 percent of its nitrogen derived from ammonia and homogeneously contained the recycled fines solids.

The reaction was terminated when 56 percent of the total nitrogen was converted to CWIN, by neutralizing the acid catalyst to pH 6.8 by admixing 0.18 Kg of finely divided magnesium oxide, containing 57 percent magnesium.

Drying of the neutralized polymerized matrix product was completed in a fluid bed dryer to provide attrition resistant homogeneous slow release composite fertilizer granules with an average crush strength of 2.5 Kg per 6-8 mesh granule.

EXAMPLE 4

This example demonstrates the new slow release composite solid fertilizer composition of this invention by analysis of the granules produced in Example 3 by chemical and liquid chromatography methods in comparison to a standard commercial nitroform fertilizer. The results are tabulated as follows:

| Product | Ex. 3 | Nitroform |
|---|---|---|
| Composition, Wt % | | |
| Total, N | 31.7 | 38.0 |
| Free Urea, N | 3.6 | 8.0 |
| Free Ammonia, N | 0.0 | 0.0 |
| Cold Water Soluble Polymer, N | 10.9 | 6.1 |
| CWIN | 17.2 | 23.9 |
| HWIN | 6.7 | 14.6 |
| Ammonia in polymer | 5.8 | 0.0 |
| AI | 60.6 | 38.9 |

The availability of the slow release nitrogen (CWIN) of Example 3, as indicated by AI, is much higher than that of a normal commercial ureaform fertilizer which contains no ammonia entity in its polymer structure. Also in the Example 3 product, the rapid acting free urea is lower and the safened cold water soluble polymer N is higher than found in the commercial product.

The osmolality of the product of Example 3 was measured to be 560 in a 3% aqueous N concentration as compared to 1400 for quick releasing urea and 3400 for potassium nitrate. Osmolality measurements have been demonstrated to correlate well with burn potentials for nitrogen fertilizers with phytotoxicities increasing as osmolalities increase. Osmolalities are normally measured at 3% N concentrations and the numbers reported as mmol/Kg.

EXAMPLE 5

This example demonstrates a preferred embodiment of the instant invention in which physically stable granular composite fertilizers are prepared which contain highly available slow release nitrogen from aminoureaformaldehyde polymers and isobutylenediurea (IBDU) particles as fertilizer enhancing solids. The device used in this example was the same as that described in Example 1.

Aqueous reactants formaldehyde, urea, and ammonia, as ammonium sulfate, were added to and commingled in the pan of the Example 1 apparatus in respective mol ratios of 1.0, to 1.3 to 0.05 with comminuted fines, in the amounts listed as follows:

| Ingredients Commingled in Pan | Wt, Kg |
|---|---|
| IBDU, 31-0-0 | 9.54 |
| U-F Concentrate, 60 HCHO, 25 Urea | 6.68 |
| Urea, 46-0-0 | 9.50 |
| Ammonium sulfate, | 1.60 |

The commingled reactants and IBDU fines were acidified to a pH of 3.4 by admixing 0.3 Kg of 0-20-0 diluted black phosphoric acid and heated to a temperature of 80° C. to initiate the acid catalyzed polymerization of ammonia, urea, and formaldehyde with the IBDU for 4.25 minutes to form a water insoluble matrix with 3.3 percent of its nitrogen derived from ammonia and which homogeneously contained the IBDU.

The acid catalyzed polymerization was terminated by neutralization with 0.18 Kg of magnesium oxide to a pH of 7.0. The neutralized polymerized matrix containing the comminuted IBDU was dried to provide a granular slow release fertilizer with the following analysis:

| Component | Wt % |
|---|---|
| Total N | 32.0 |
| Free Urea N | 2.7 |
| Water Soluble Polymer, N | 13.4 |
| CWIN | 15.9 |
| HWIN | 6.2 |
| AI | 61.0 |

I claim:

1. A method of preparing highly available aminoureaformaldehyde slow release nitrogen fertilizer solids, comprising,
   (a) commingling aqueous reactants, formaldehyde, urea and ammonia in a respective mol ratio of 1.0, to between 1.0 and 2.0, to between 0.05 and 1.0;
   (b) acidifying the commingled aqueous reactants to a pH between 2.8 and 4.0, and heating to a temperature between 60 and 125° C. with commingling continued to initiate acid catalyzed polymerization of formaldehyde, urea, and ammonia;
   (c) continuing the acid catalyzed polymerization for a period of time between 2 and 20 minutes until the ammonia is reacted with the urea and formaldehyde to produce water insoluble nitrogen in the form of aminoureaformaldehyde polymer containing between 3 and 25 percent of its nitrogen derived from ammonia;
   (d) terminating the polymerization when between 50 and 85 percent of the urea nitrogen is converted to cold water insoluble nitrogen, by neutralizing the acid catalyst.

2. The method of claim 1 wherein aqueous ureaformaldehyde concentrate containing between 45 and 60 percent formaldehyde and between 20 and 30 percent urea is used as an economical source of formaldehyde and urea.

3. The method of claim 1 wherein the ammonia is an ionic compound which provides ammonium ions in water.

4. The method of claim 1 wherein the ammonia is selected from the group of ionic ammonium compounds consisting of ammonia, ammonium sulfate, ammonium phosphate, ammonium chloride, ammonium hydroxide, hexamethylene tetramine, and ammonium nitrate.

5. The method of claim 1 wherein the aqueous reactants formaldehyde, urea, and ammonia are in respective mol ratios of 1.0, 1.35 to 1.85, and 0.14 to 0.75.

6. The method of claim 1 wherein the commingled aqueous reactants are acidified to a pH between 3.0 and 3.3 and heated to a temperature between 80 and 104° C. for acid catalyzed polymerization.

7. The method of claim 1 wherein the acid catalyzed polymerization is continued for between 5 and 12 minutes until the ammonia is reacted with urea and formaldehyde to form cold water insoluble nitrogen polymer containing between 10 and 20 percent of its nitrogen content derived from ammonia.

8. The method of claim 1 wherein the polymerization is terminated when between 60 and 75 percent of the urea nitrogen is converted to cold water insoluble nitrogen, by neutralizing the acid catalyst.

9. A highly available slow release aminoureaformaldehyde nitrogen fertilizer composition, prepared by the method of Example 1, comprising between 15 and 42 percent total nitrogen of which between 3 and 25 percent is derived from ammonia and the remainder substantially derived from urea, with between 50 and 85 percent of the urea converted to cold water insoluble nitrogen which exhibits an activity index more than 45.

10. A method of producing physically stable fertilizers containing highly available slow release nitrogen and fertilizer enhancing solids, comprising,
(a) commingling aqueous reactants formaldehyde, urea, and ammonia in respective mol ratios of 1.0, to between 1.0 and 2.0, and to between 0.05 and 0.75, with one or more comminuted fertilizer enhancing solids amounting to between 10 and 50 percent of the fertilizer;
(b) acidifying the commingled reactants and comminuted solids to a pH between 2.8 and 3.2 and heating to a temperature between 60 and 125° C. to initiate acid catalyzed polymerization of the ammonia, urea and formaldehyde to aminoureaformaldehyde polymers;
(c) continuing the acid catalyzed polymerization for a period of time between 2 and 20 minutes until the ammonia is reacted with the urea and formaldehyde to form a matrix of water insoluble aminoureaformaldehyde polymer containing between 3 and 25 percent of its nitrogen derived from ammonia and homogeneously containing the one or more comminuted fertilizer enhancing solids;
(d) terminating the acid catalyzed polymerization when between 50 and 85 percent of the urea nitrogen is converted to cold water insoluble nitrogen, by neutralizing the acid catalyst;
(e) drying the neutralized polymerized matrix and homogeneously contained comminuted solids to provide a slow release composite fertilizer.

11. The method of claim 10 wherein the comminuted fertilizer enhancing solids comprise recycled slow release composite fertilizers prepared by the method of claim 10.

12. The method of claim 10 wherein the comminuted fertilizer enhancing solids are selected from the group of solid fertilizer enhancing nutrients consisting of potassium, phosphorous, magnesium, calcium, iron, ureaformaldehyde polymers, and aminoureaformaldehyde polymers.

13. The method of claim 10 wherein the comminuted fertilizer enhancing solids are isobutylene diurea.

14. The method of claim 10 wherein the comminuted fertilizer enhancing solids are selected from the group of non-nutritive solids consisting of clay fertilizer conditioners, soil conditioners, mulches, cytokinins, and plant growth stimulants.

15. The method of claim 10 wherein the reactants and comminuted solids are acidified by the addition of one, or more, acidic materials selected from the group consisting of phosphoric acid, formic acid, sulfuric acid, oxalic acid, citric acid, nitric acid, and ammonium sulfate.

16. The method of claim 10 wherein the matrix of water insoluble nitrogen polymer is formed containing between 10 and 20 percent of its nitrogen content derived from ammonia.

17. The method of claim 10 wherein the acid catalyst is neutralized to a pH between 6.0 and 7.5, with a base material selected from the group consisting of magnesia, lime, caustic soda, caustic potash, ammonia, soda ash, and potash.

18. A slow release composite solid fertilizer composition prepared by the method of claim 10, comprising a highly available aminoureaformaldehyde cold water insoluble nitrogen matrix homogeneously containing one, or more, fertilizer enhancing materials, the composition containing between 15 and 42 percent total nitrogen, of which between 2 and 20 percent is derived from ammonia, and containing between 10 and 50 percent of comminuted fertilizer enhancing solids.

19. A method of producing granular highly available aminoureaformaldehyde slow release composite fertilizers, comprising,
(a) commingling aqueous reactants formaldehyde, urea, and ammonia, in respective mol ratios of 1.0, between 1.0 and 2.0, and between 0.05 and 0.75, with one or more comminuted fertilizer enhancing solids amounting to between 0 and 50 percent of the fertilizer granules;
(b) acidifying the commingled reactants and comminuted solids to a pH between 2.8 and 3.2 and heating to a temperature between 60 and 125° C. to initiate acid catalyzed polymerization of the formaldehyde, urea, and ammonia to aminoureaformaldehyde polymers, in a rotating inclined pan which carries the polymers toward a stationary wall scraper-deflector which deflects the polymer toward a high speed rotor which applies a strong shear force and homogenization to the polymer and the fertilizer enhancing solids;
(c) repeatedly passing the initially viscous liquid polymer and solids through the rotor and rolling the polymer and solids along the walls of the rotating inclined pan as the acid catalyzed polymerization continues until the ammonia is reacted with the urea and formaldehyde and a fluid matrix of water insoluble aminoureaformaldehyde polymer is formed into semi-spherical granules containing between 3 and 25 percent of their nitrogen derived from ammonia and homogeneously containing between 0 and 50 percent of comminuted fertilizer enhancing solids;

(d) terminating the acid catalyzed polymerization when the semi-spherical granules solidify and between 50 and 85 percent of the urea nitrogen is converted to cold water insoluble nitrogen by neutralizing the acid catalyst to a pH between 6.5 and 7.5 with a base.

* * * * *